(No Model.)

M. S. CLINE.
SULKY HARROW.

No. 347,773. Patented Aug. 24, 1886.

Witnesses
M. Fowler
E. G. Siggers

Inventor
M. S. Cline
By his Attorneys

UNITED STATES PATENT OFFICE.

MILAN SAGE CLINE, OF BRISTOW, IOWA.

SULKY-HARROW.

SPECIFICATION forming part of Letters Patent No. 347,773, dated August 24, 1886.

Application filed April 29, 1886. Serial No. 200,590. (No model.)

*To all whom it may concern:*

Be it known that I, MILAN SAGE CLINE, a citizen of the United States, residing at Bristow, in the county of Butler and State of Iowa, have invented a new and useful Improvement in Sulky-Harrows, of which the following is a specification.

My invention relates to an improvement in sulky-harrows; and it consists in the peculiar construction and combination of devices, that will be more fully set forth hereinafter, and particularly pointed out in the claims.

Figure 1:
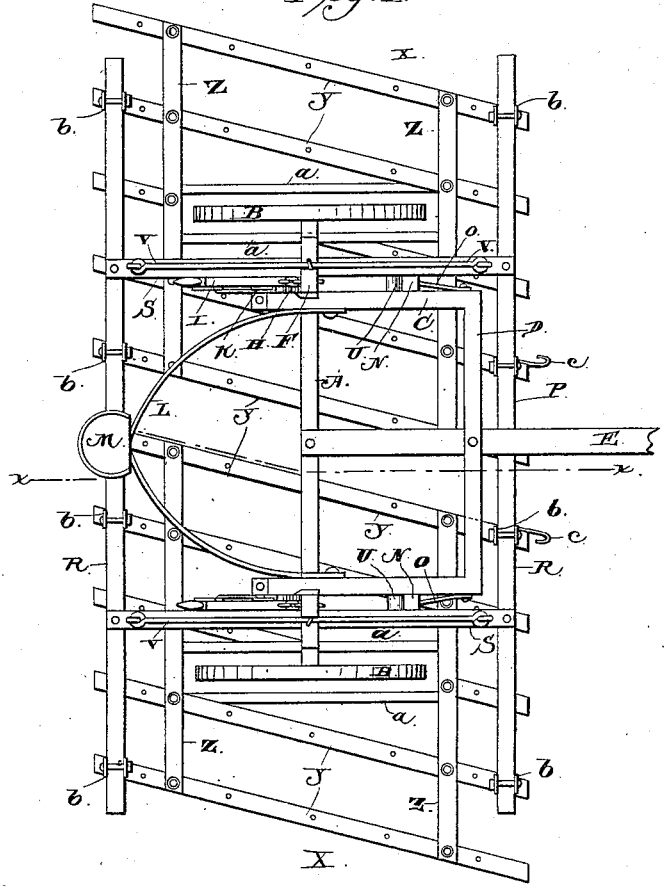
Figure 2:
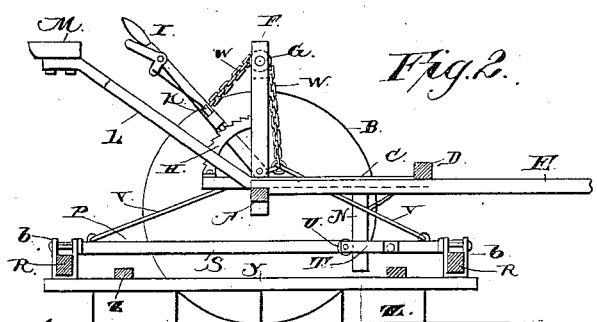

In the drawings, Figure 1 is a top plan view of a sulky-harrow embodying my improvements. Fig. 2 is a sectional view of the same on the line $x\ x$ of Fig. 1.

A represents an axle, to the projecting spindles of which are journaled supporting-wheels B. Longitudinal beams C are attached near their rear ends to the axle, at a suitable distance from the outer ends thereof, and the front ends of the side beams, C, are connected together by a transverse bar, D.

E represents the tongue, the rear end of which is attached to the center of the axle, and the said tongue is also attached to the center of the cross-bar D. Near the outer ends of the axle are attached vertical standards F, to the upper ends of which, on their outer sides, are journaled sheaves G.

H represents curved segment rack-bars, the rear ends of which are attached to the rear extending ends of the side beams, C, and the front upper ends of the said bars H are attached to the standards F at a suitable distance above the axle.

I represents a pair of hand-levers, each of which is pivoted at its lower end on the outer side of one of the standards F, and the said hand-levers I are provided with spring-actuated sliding locking-bolts K, for engaging with the rack-teeth of the segment-bars, so as to lock the hand-levers at any desired angle.

L represents a spring bail or loop, which is bent substantially to form a semicircle, the front end of the arms of the said bail or loop being attached to the side beams, C, just in advance of the axle, and the said arms bearing on the said axle and extending rearwardly and upwardly at a suitable angle, as shown in Fig. 2. This bail or loop carries a driver's seat, M.

From the side beams, C, near the front ends thereof, depend vertical standards N, which are braced by means of brace-bars O.

P represents a frame, which is composed of two long transverse bars, R, and a pair of longitudinal bars, S, the ends of which are attached to the bars R at a considerable distance from the ends of the latter. The space between the side bars, S, corresponds to the distance from the outer side of one of the standards N to the outer side of the other said standard. On the inner sides of the side bars, S, near their front ends, are secured keepers T, in the rear ends of which are journaled anti-friction rollers U. The lower ends of the standards N are secured between the said keepers and the opposing sides of the side bars, S.

V represents chains or rods, the ends of which are attached near the ends of the side bars, S, and thereby forming loops, which are attached to the depending ends of elevating-chains W, which pass over the sheaves G on the standards F. The rear ends of the chains W are attached to the hand-levers I. By this construction it will be readily understood that the frame P is suspended from the sulky-frame, and that the said frame P may be readily raised or lowered at either or both ends by means of the levers I.

X represents a pair of harrow frames, which are each composed of the diagonally-arranged parallel longitudinal beams Y, connected near their front and rear ends by the transverse beams Z. At the center of each of the sectional harrow-frames are arranged two parallel longitudinal beams, $a$, which extend at right angles to the cross-beams Z, and are secured to the said beams at a suitable distance apart, thereby forming rectangular openings in the centers of the harrow-frames for the lower sides of the wheels B. The usual harrow-teeth are attached to the diagonally-arranged beams Y. These harrows X are provided at their front and rear sides with clips $b$, by means of which they are attached to the long transverse bars R of the frame P, and the front ends of the said harrow-sections X are also provided with draft-hooks $c$, for the attachment of the draft-animals.

The operation of my invention will be readily understood from the foregoing description and by reference to the accompanying drawings. By suspending the harrow-sections from the ends of the frame P and providing means for raising either or both ends of the said frame it will be understood that both of the harrow-sections may be raised from the ground simultaneously, or that one may be raised in order to clear an obstruction while the other remains on the ground and at work.

Having thus described my invention, I claim—

1. The combination of the sulky-frame having the depending standards N with the frame P, comprising the long transverse bars R and the short longitudinal connecting-bars S, the said bars S bearing against the standards N and having the keepers T, which encompass the said standards, the elevating-chains depending from the sulky-frame, and to which the frame P is attached, and the harrow attached to and suspended from the frame P, substantially as described.

2. The combination of the sulky-frame having the vertical upwardly-extending standards F, provided with the sheaves G and the depending standards N, the frame P below the sulky-frame and connected to the standards N and adapted to slide vertically thereon, the elevating-chains W on the sheaves G, and having at their lower ends the diverging rods V, attached to the front and rear sides of the frame P, the hand-levers fulcrumed to the sulky-frame, and to which the free ends of the elevating-chains are attached, and the harrow suspended from the frame P, substantially as described.

3. The combination of the sulky frame having the supporting-wheels with the frame P, suspended from the sulky-frame and vertically movable with relation thereto, and the harrow-sections suspended from and attached to the frame P, the said sections comprising the diagonally-arranged beams Y, the front and rear connecting transverse beams Z, and the parallel longitudinal beams a, extending at right angles to the cross-beams Z, and thereby forming openings in the harrow-sections for the lower sides of the supporting-wheels, substantially as described.

In testimony that I claim the foregoing as my own I have hereto affixed my signature in presence of two witnesses.

MILAN SAGE CLINE.

Witnesses:
CHAS. S. STEWART,
GEORGE B. BERAGE.